3,411,632
THROWAWAY FILTER WITH DOME-SHAPED BOTTOM PLATE
Robert J. Offer, Racine, and Glenn F. Minnick, Janesville, Wis., assignors to Walker Manufacturing Company, Racine, Wis., a corporation of Delaware
Filed Aug. 3, 1966, Ser. No. 569,965
3 Claims. (Cl. 210—440)

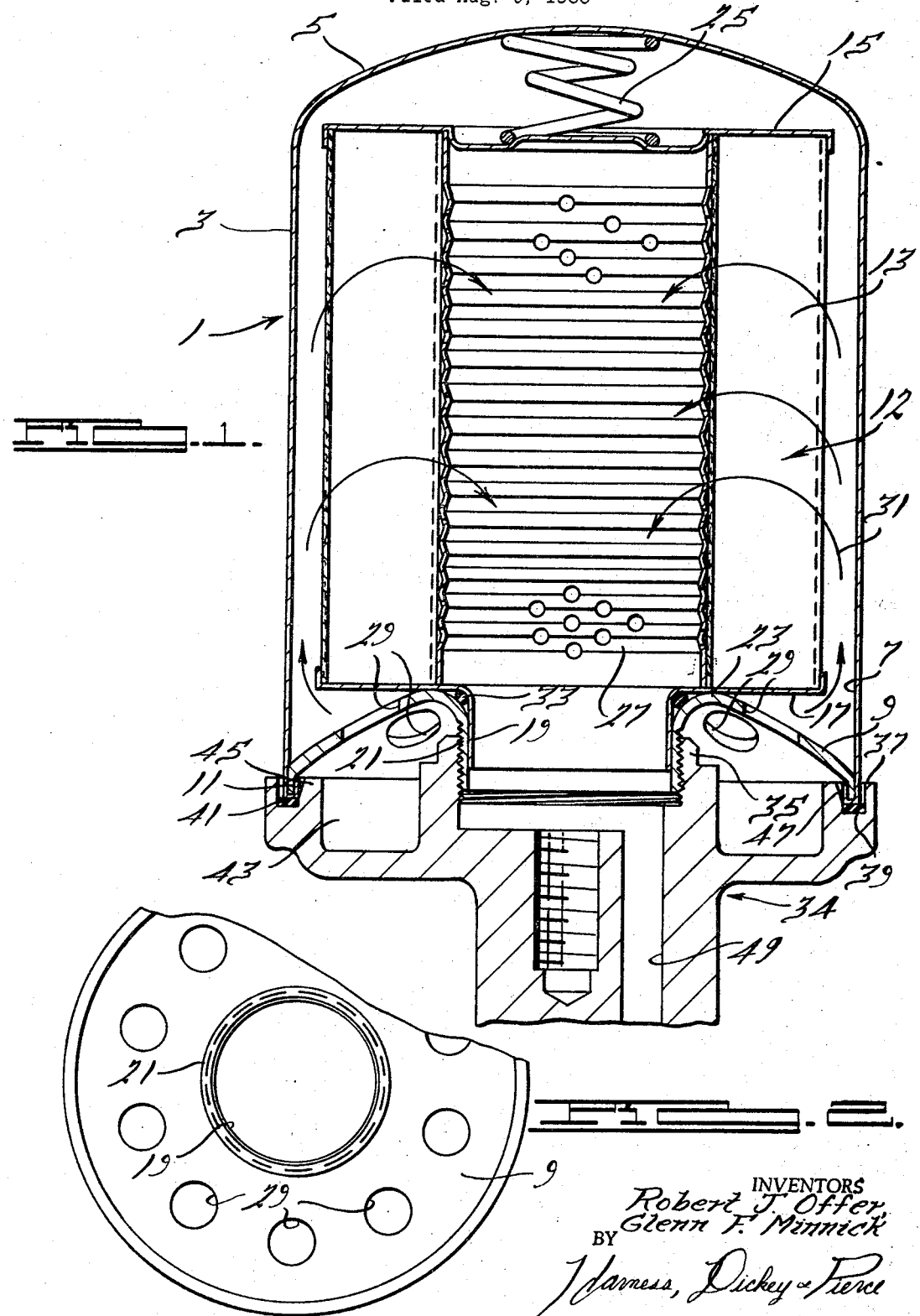
INVENTORS
Robert J. Offer,
Glenn F. Minnick
BY Harness, Dickey & Pierce
ATTORNEYS

# United States Patent Office 3,411,632
Patented Nov. 19, 1968

ABSTRACT OF THE DISCLOSURE

A disposable oil filter having an outer shell with a base plate at one end that is of a dome shape and which has a reversely bent joint connection at its outer periphery with the shell that serves as a means for sealing the filter on the filter mounting.

---

Our invention relates to liquid filter devices and, in particular, to throwaway or disposable type oil filters used on internal combustion engines.

Throwaway type oil filters commonly have an outer housing which is closed at one end and open at the other end. The open end is closed by a base plate which is secured around its periphery to the housing and which is provided with means for attaching it to the filter mounting on the engine so as to provide a path for the flow of oil from the engine to the filter and back to the engine again. Considerable forces from oil pressure as well as from the threaded connection used in securing the filter to the filter mounting act on the base plate tending to cause distortion or oil leakage. It is essential, of course, that leakage or excessive distortion be eliminated.

With the foregoing in mind, it is an object of this invention to provide a throwaway oil filter having an improved base plate construction which increases the strength of the base plate and decreases the cost of manufacture of the filter as compared with designs presently in commercial use.

It is also an object of the invention to provide a base plate construction for a throwaway filter which incorporates a new seal arrangement that reduces the possibility of oil leakage to a minimum.

The invention is illustrated in the accompaniying drawings, in which:

FIGURE 1 is a longitudinal cross section through the improved filter and a portion of a filter mounting base, and FIGURE 2 is a bottom view partly broken away, of the throwaway filter of FIGURE 1.

The filter cartridge 1 of the drawings has a shell or housing 3 which is closed at the end 5 and open at the opposite end 7. A base plate 9 is secured in a joint 11 to the end 7 of the housing 3 and forms a closure for the open end of housing 3. Inside of the housing 3 is a filter element 12 which may be of any desired construction, the form shown comprising a pleated paper filter material 13 which is secured at one end to an imperforate end cap 15 and at the other end to an end cap 17 that has a neck 19 formed on it which fits inside of an externally threaded neck 21 formed in the base plate 9. The filter element 12 is held against the inner end surface or shoulder 23 of the base plate 9 by means of a holddown spring 25 which acts between the end 5 and the end plate 15. A center tube 27, which is perforated throughout, fits between the end caps 15 and 17. It will be noted that while the neck 21 terminates substantially in the radial plane of joint 11 its inside end extends a substantial distance into the filter whereby the web of the plate 9 is sharply tapered into a conical or dome shape that provides the plate with great resistance to deformation.

Oil enters the filter by passing through openings 29 in the base plate 9 to flow radially outwardly, as indicated by the arrows, through the space 31 between the filter element 12 and the wall of the housing 3. It then flows radially inwardly through the filter material 13 where it is filtered and then passes through the center tube 27 to flow down through the neck 19 and the neck 21. Bypassing of flow from the openings 29 between the necks 19 and 21 is prevented by an O-ring seal 33 which is compressed between the two necks in the space between the corner of the neck 19 and the surface 23 of base plate 9.

The filter 1 is adapted to be mounted on a suitable filter mounting 34 which forms a part of the engine to be lubricated and which may include a boss section 35 that is internally threaded to receive the neck 21 of the filter cartridge base plate 9. It may also include an outer surface 37 for sealing against the outer edge 11 of the cartridge 1. In the structure illustrated, there is a circular recess 39 formed in the outer surface 37 which contains an annular rubber sealing ring 41 that engages and is compressed by the bottom edge 11 of the filter when it is screwed in place in the boss 35.

The annular chamber 43 of base 34 contains dirty oil to be filtered under pressure and is sealed by the outer edge 11 and the gasket 41. Oil flow is therefore from the chamber 43 through the openings 29 to the interior of the housing 3, and it will be seen that the oil pressure on the opposite sides of the annular flange 45 of the base plate 9 which is trapped in the turned-over edge portion 47 of the housing 3 in the joint 11, is substantially the same. There is no real pressure differential tending to cause oil leakage through the joint 11 and should it occur it is merely flow between the inside of the filter cartridge and the inlet chamber 43. Hence, harmful leakage at the critical point of seal between the filter and the filter mounting is eliminated. Filtered oil from center tube 27 flows into the outlet chamber 49 of the mounting 34. It is to be noted that the fluid ports are all located inside the seam 11.

It will be seen that the above construction as compared with throwaway cartridges now available on the open market, has important advantages. The one-piece construction for the base plate 9 is simpler and less expensive to manufacture. No sealant is required at the joint or seam 11 since the gasket is outside of the seam. Leakage is positively prevented even though a simple shell-base plate joint is used as well as a simple gasket structure. The dome shape of the base plate is inherently a strong design that resists deformation as a result of the forces applied to screw the filter in place. Since oil pressure is equalized on opposite sides of the plate, deformation due to oil pressure differential is eliminated. In addition, the joint or seam between the base plate and the end of the housing or shell 3 is such as to permit a very simple type of seal which can be of the type illustrated or, alternatively, could be a ring attached to the end of the joint 11 to engage a flat surface on the filter mounting.

Modifications may be made in the structure illustrated without departing from the spirit and scope of the invention.

We claim:
1. A disposable filter for removable attachment to a filter mounting comprising an outer tubular shell having an open end and a closed end, a base plate attached to the open end of said shell and closing said open end, said base plate end being constructed to be attached to said filter mounting, said base plate having an annular peripheral flange secured to the open end of said shell in such a manner that the secured portion of said plate and shell serves as a sealing joint upon attachment of the filter to said mounting, said base plate having an annular externally threaded central neck and a web interconnecting said flange and neck, said web having inlet port means therein for entry of liquid to be filtered, the inside of said central neck forming the outlet for filtered liquid, an annular filter element supported on said base plate in the path of liquid flow between said port means and said outlet, said neck being substantially longer than said flange and said web extending at a substantial angle to the longitudinal axis of the shell to provide a dome-shape to said base plate that extends inwardly of the shell in the direction of the closed end, said filter element pressing against the apex portion of the dome-shaped base plate, and said externally threaded central neck being constructed to be threaded to said filter mounting to secure the filter on the mounting.

2. A filter as set forth in claim 1 wherein said flange fits inside the end of the shell and said shell has a reversely bent end portion folded inwardly over the flange to form a joint with the base plate for engagement with a sealing surface on said filter mounting.

3. A filter as set forth in claim 1 wherein said filter element has a central outlet neck fitting inside the base plate neck and including an O-ring seal between said two central necks.

References Cited
UNITED STATES PATENTS

| | | | |
|---|---|---|---|
| 3,067,880 | 12/1962 | Bowers et al. | 210—444 X |

FOREIGN PATENTS

| | | |
|---|---|---|
| 1,303,569 | 8/1962 | France. |
| 1,189,520 | 3/1965 | Germany. |
| 965,328 | 7/1964 | Great Britain. |

REUBEN FRIEDMAN, *Primary Examiner.*

W. S. BRADBURY, *Assistant Examiner.*